(12) United States Patent
Xie et al.

(10) Patent No.: US 10,036,858 B2
(45) Date of Patent: Jul. 31, 2018

(54) SYSTEM AND METHOD OF AUTOMATICALLY INSERTING FIBER

(71) Applicants: Tyco Electronics (Shanghai) Co. Ltd., Shanghai (CN); TE Connectivity Corporation, Berwyn, PA (US)

(72) Inventors: Fengchun Xie, Shanghai (CN); Dandan Zhang, Shanghai (CN); Lyhai Hu, Shanghai (CN); Hang Lee, Shanghai (CN); Yu Zhang, Shanghai (CN); Roberto Francisco-Yi Lu, Berwyn, PA (US)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 15/590,337

(22) Filed: May 9, 2017

(65) Prior Publication Data
US 2017/0242202 A1    Aug. 24, 2017

Related U.S. Application Data (63) Continuation of application No. PCT/IB2015/058634, filed on Nov. 9, 2015.

(30) Foreign Application Priority Data

Nov. 10, 2014   (CN) .......................... 2014 1 0627777

(51) Int. Cl.
*G02B 6/38*    (2006.01)
*G02B 6/36*    (2006.01)

(52) U.S. Cl.
CPC ......... *G02B 6/3885* (2013.01); *G02B 6/3672* (2013.01); *G02B 6/3839* (2013.01);
(Continued)

(58) Field of Classification Search
CPC ... G02B 6/3834; G02B 6/3833; G02B 6/3843
See application file for complete search history.

(56) References Cited

U.S. PATENT DOCUMENTS 6,034,718 A    3/2000   Hattori
6,913,397 B2   7/2005   Kang et al.

FOREIGN PATENT DOCUMENTS

| | | |
|---|---|---|
| EP | 0489169 A1 | 6/1992 |
| JP | 07333466 A | 12/1995 |
| JP | 0915088 A  | 1/1997 |

OTHER PUBLICATIONS

Written Opinion and International Search Report, dated Feb. 19, 2016, 10 pages.
(Continued)

*Primary Examiner* — Omar R Rojas
(74) *Attorney, Agent, or Firm* — Barley Snyder (57) ABSTRACT

A system for automatically inserting fibers is disclosed. The system comprises a cable having a plurality of fibers, a ferrule having a plurality of bores, a moving mechanism movable in a first direction, a second direction, and a third direction that are perpendicular to each other, a cable holder mounted on the moving mechanism and holding the cable, and a vision device. The moving mechanism moves the cable holder under the guidance of the vision device to align the plurality of fibers with the ferrule and insert the plurality of fibers into the plurality of bores.

23 Claims, 5 Drawing Sheets

(52) U.S. Cl.
CPC .......... *G02B 6/3843* (2013.01); *G02B 6/3628* (2013.01); *G02B 6/3644* (2013.01); *G02B 6/38* (2013.01); *G02B 6/3801* (2013.01); *G02B 6/381* (2013.01); *G02B 6/3807* (2013.01); *G02B 6/3833* (2013.01); *G02B 6/3849* (2013.01)

(56) References Cited

OTHER PUBLICATIONS

Abstract of JPH07333466, dated Dec. 22, 1995, 2 pages.
Abstract of JPH0915088, dated Jan. 17, 1997, 2 pages.
International Preliminary Report on Patentability and Written Opinion of the International Searching Authority, dated May 16, 2017, 7 pages.

SYSTEM AND METHOD OF AUTOMATICALLY INSERTING FIBER

CROSS-REFERENCE TO RELATED APPLICATIONS

This application is a continuation of PCT International Application No. PCT/IB2015/058634, filed on Nov. 9, 2015, which claims priority under 35 U.S.C. § 119 to Chinese Patent Application No. 201410627777.0, filed on Nov. 10, 2014.

FIELD OF THE INVENTION

The present invention relates to a system and a method of automatically inserting fibers, and more particularly, to a system and a method of automatically inserting fibers of a cable into a ferrule.

BACKGROUND

A system for automatically inserting a single fiber of a cable into a single-bore ferrule is known in the art. However, a system for automatically inserting a row of fibers of a cable into a row of bores of a ferrule has not been developed, as inserting a row of fibers of a cable into a row of bores of a ferrule is substantially more complicated and difficult than inserting a single fiber of a cable into a single-bore ferrule. Currently, a row of fibers of a cable is manually inserted into a row of bores of a ferrule, which leads to low production efficiency and quality control difficulties.

SUMMARY

An object of the invention, among others, is to provide a system and method of automatically inserting a plurality of fibers of a cable into a plurality of bores of a ferrule efficiently and with high quality. The disclosed system comprises a cable having a plurality of fibers, a ferrule having a plurality of bores, a moving mechanism movable in a first direction, a second direction, and a third direction that are perpendicular to each other, a cable holder mounted on the moving mechanism and holding the cable, and a vision device. The moving mechanism moves the cable holder under the guidance of the vision device to align the plurality of fibers with the ferrule and insert the plurality of fibers into the plurality of bores.

BRIEF DESCRIPTION OF THE DRAWINGS

The invention will now be described by way of example with reference to the accompanying figures, of which:

FIG. 2b is a front perspective view of the ferrule of FIG. 2a;

DETAILED DESCRIPTION OF THE EMBODIMENT(S)

The invention is explained in greater detail below with reference to embodiments of a system for automatically inserting fibers. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 3:
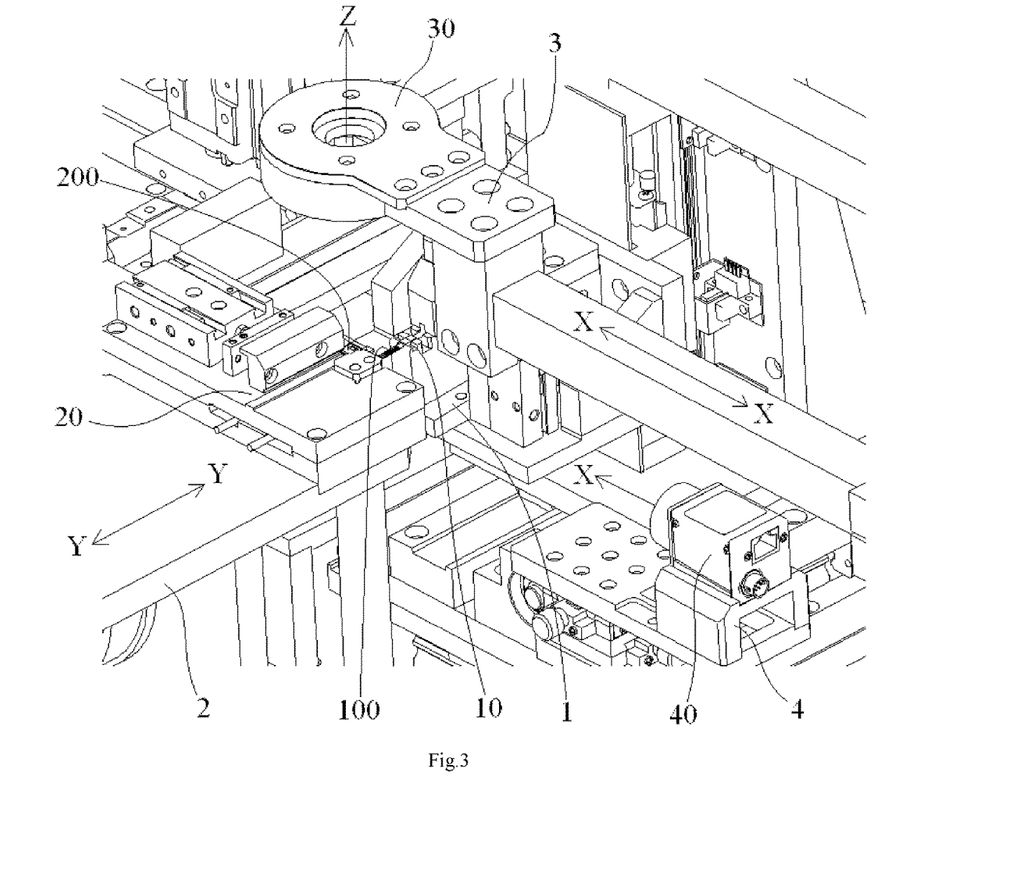
FIG. 3 is a perspective view of the system for automatically inserting fibers.
Figure 4:
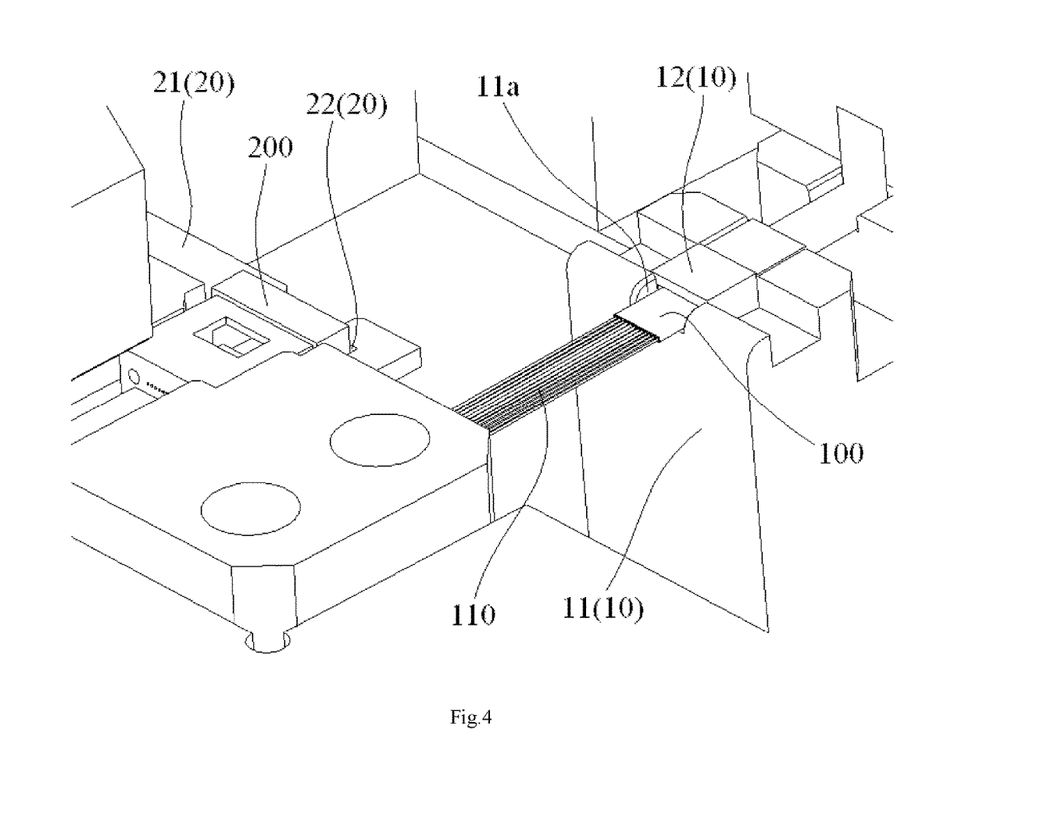
FIG. 4 is a detailed view of the system of FIG. 3.

A system for automatically inserting fibers is shown generally in FIGS. 3 and 4. The system includes a cable 100, a ferrule 200, a moving mechanism 1, a cable holder 10, a ferrule holder 20, and a vision device 30, 40.

Figure 1:
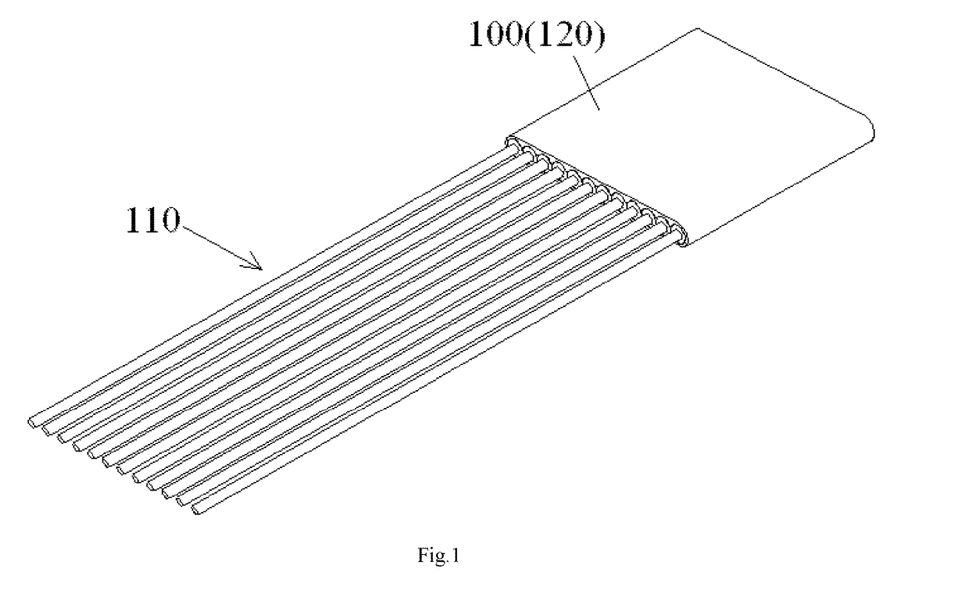
FIG. 1 is a perspective view of a cable of a system for automatically inserting fibers according to the invention.

The cable 100 is shown in FIG. 1. The cable 100 may be a ribbon cable known to those with ordinary skill in the art. The cable 100 has a plurality of fibers 110 and an outer protection layer 120 enclosing the fibers 110 therein. In the shown embodiment, the plurality of fibers 110 is arranged in one row. However, as would be understood by one with ordinary skill in the art, the plurality of fibers 110 may alternatively be arranged in two or more rows.

Figure 2A:
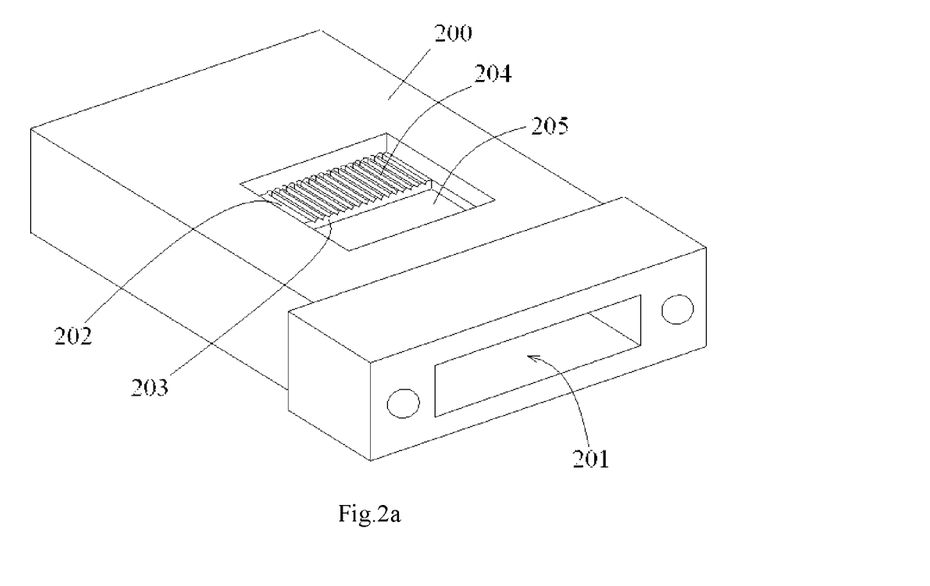
FIG. 2a is a rear perspective view of a ferrule of the system for automatically inserting fibers.
Figure 2B:
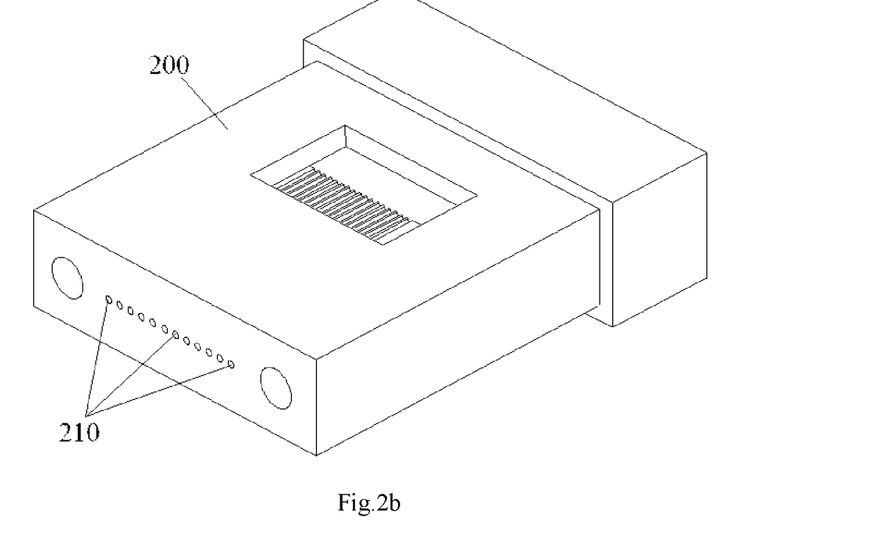

The ferrule 200 is shown in FIGS. 2a and 2b. The ferrule 200 has a cable receiving chamber 201 formed in a rear portion and a plurality of bores 210 formed in an opposite front portion. In the shown embodiment, the plurality of bores 210 are arranged in one row. However, as would be understood by one with ordinary skill in the art, the plurality of bores 210 may alternatively be arranged in two or more rows. A platform 202 is formed on and protrudes from a bottom surface of the cable receiving chamber 201. A row of guiding recesses 204 are formed in a top surface of the platform 202. An opening 205, through which the platform 202 is exposed to the outside, is formed in a top wall of the cable receiving chamber 201.

The moving mechanism 1, as shown in FIG. 3, may be any mechanism known to those with ordinary skill in the art capable of moving in a first direction X, a second direction Y, and a third direction Z that are perpendicular to each other.

The cable holder 10 is shown in FIGS. 3 and 4. As shown in FIG. 4, the cable holder 10 comprises a stationary seat 11 and a movable pressing plate 12. A cable positioning slot 11a is formed in the stationary seat 11. The cable holder 10, however, is not limited to the embodiment shown in FIGS. 3 and 4, and may alternatively be any other suitable clamp.

The ferrule holder 20 is shown in FIGS. 3 and 4. As shown in FIG. 4, the ferrule holder 20 comprises a stationary block 21 and a ferrule positioning slot 22 formed in the stationary block 21.

The vision device 30, 40 is shown in FIG. 3. The vision device 30, 40 comprises a first imaging apparatus 30, a second imaging apparatus 40, and an image recognition apparatus (not shown) connected to the first imaging apparatus 30 and the second imaging apparatus 40. The image recognition apparatus includes a processor executing program instructions stored on a memory, the memory including non-transitory computer readable medium. The first imaging apparatus 30 and the second imaging apparatus 40, for example, each may be a camera.

The assembly of the system for automatically inserting fibers will now be described in greater detail with reference to FIGS. 3-5. In the shown embodiment, the first direction X is defined as a left-right direction, the second direction Y is defined as a front-rear direction, and the third direction Z is defined as a vertical direction. The first direction X and the second direction Y define a horizontal plane perpendicular to the third direction Z.

The cable holder 10 is mounted on the moving mechanism 1. The stationary seat 11 may be mounted on an end portion of the moving mechanism 1.

The cable 100 is positioned in the cable holder 10, as shown in FIG. 4, so that a top surface and a bottom surface of the cable 100 are parallel to the horizontal plane defined by the first direction X and the second direction Y, that is, the plurality of fibers 110 are parallel to the horizontal plane defined by the first direction X and the second direction Y. The cable 100 may be fitted in the cable positioning slot 11a. The movable pressing plate 12 presses the cable 100, so as to hold the cable 100 in a place. The movable pressing plate 12 is movable relative to the stationary seat 11, so as to press or release the cable 100.

The ferrule 200 is positioned in the ferrule holder 20, as shown in FIG. 4, so that a top surface and a bottom surface of the ferrule 200 are parallel to the horizontal plane defined by the first direction X and the second direction Y, that is, the plurality of bores 210 are parallel to the horizontal plane defined by the first direction X and the second direction Y. The ferrule 200 is fitted in the ferrule positioning slot 22. The ferrule holder 20 is fixed on a stationary working table 2 of the system, as shown in FIG. 3, with the stationary block 21 mounted on the working table 2.

The first imaging apparatus 30 is positioned so that an optical axis thereof is parallel to the third direction Z. The first imaging apparatus 30 is fixed on a stationary support frame 3, and is not moved together with the moving mechanism 1.

The second imaging apparatus 40 is positioned so that an optical axis thereof is parallel to the first direction X. The second imaging apparatus 40 is fixed on a stationary support frame 4, and is not moved together with the moving mechanism 1.

The use of the system for automatically inserting fibers will now be described in greater detail with reference to FIGS. 3-5. The system automatically inserts the plurality of fibers 110 into the plurality of bores 210. Before inserting the cable 100 into a ferrule 200, a section of the outer protection layer 120 is stripped to expose a predetermined length of the plurality of fibers 110.

Figure 5A:
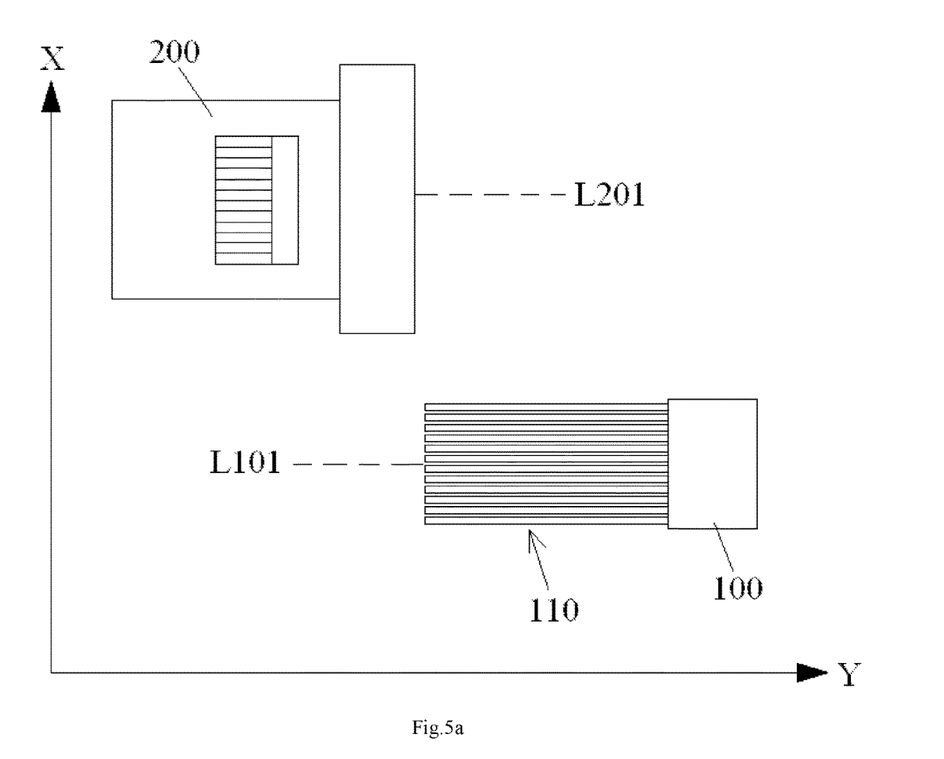
FIG. 5a is a schematic view of a first image captured by a first imaging apparatus of the system for automatically inserting fibers.

The first imaging apparatus 30 captures a first image, shown in FIG. 5a, of the plurality of fibers 110 and the ferrule 200 in the third direction Z. The second imaging apparatus 40 captures a second image, shown in FIG. 5b, of the plurality of fibers 110 and the ferrule 200 in the first direction X. As shown in FIGS. 5a and 5b, the image recognition apparatus receives the first image and the second image, and uses the processor to execute a program stored on the memory to identify a center line L101 of the plurality of fibers 110 and a center line L201 of the ferrule 200 in the first image and identify a center line L102 of the plurality of fibers 110 and a center line L202 of the ferrule 200 in the second image.

As shown in FIG. 5a, in the first image, the center line L101 of an end surface profile of the plurality of fibers 110 and the center line L201 of an end surface profile of the ferrule 200 are obtained. For example, as shown in FIG. 5a, if the center line L101 of the end surface profile of the plurality of fibers 110 is not aligned with the center line L201 of the end surface profile of the ferrule 200, the moving mechanism 1 receives an instruction from the image recognition apparatus to move the cable holder 10 in the first direction X until the center line L101 of the end surface profile of the plurality of fibers 110 is aligned with the center line L201 of the end surface profile of the ferrule 200.

Figure 5B:
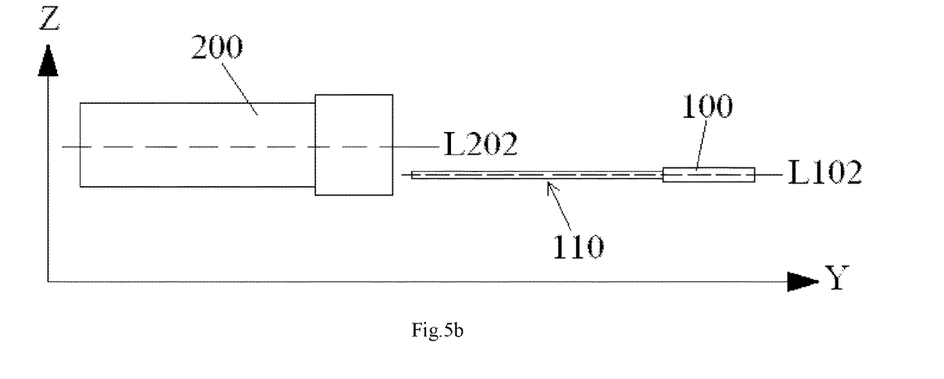
FIG. 5b is a schematic view of a second image captured by a second imaging apparatus of the system for automatically inserting fibers.

As shown in FIG. 5b, in the second image, the center line L102 of the end surface profile of the plurality of fibers 110 and the center line L202 of the end surface profile of the ferrule 200 are obtained. For example, as shown in FIG. 5b, if the center line L102 of the end surface profile of the plurality of fibers 110 is not aligned with the center line L202 of the end surface profile of the ferrule 200, the moving mechanism 1 receives an instruction from the image recognition apparatus to move the cable holder 10 in the third direction Z until the center line L102 of the end surface profile of the plurality of fibers 110 is aligned with the center line L202 of the end surface profile of the ferrule 200.

After the center line L101 of the plurality of fibers 110 and the center line L201 of the ferrule 200 in the first image are aligned with each other and the center line L102 of the plurality of fibers 110 and the center line L202 of the ferrule 200 in the second image are aligned with each other, the center of the end surface profile of the plurality of fibers 110 is aligned with the center of the end surface profile of the ferrule 200 entirely. Then, the moving mechanism 1 moves the cable holder 10 in the second direction Y, so as to insert the plurality of fibers 110 into the plurality of bores 210 of the ferrule 200.

As shown in FIGS. 2-4, first imaging apparatus 30 is located above the cable holder 10 and the ferrule holder 20, and the platform 202 is exposed outside through an opening 205 formed in a top wall of the cable receiving chamber 201. In this way, the imaging apparatus 30 may capture an image of an end surface of the plurality of fibers 110 and an end surface 203 of the platform 202 at the same time, and a position of the end surface of the plurality of fibers 110 relative to the end surface 203 of the platform 202 may be determined by the image recognition device based on the image.

If the diameter of each fiber 110 is larger than a reference diameter due to a manufacturing error, the lower edge of the end surface profile of the plurality of fibers 110 may be lower than an upper edge of the end surface 203 of the platform 202 during inserting the fibers 110. Thereby, there may be a risk that the lower edge of the end surface profile of the plurality of fibers 110 contacts and collides with the upper edge of the end surface 203 of the platform 202, which may break the fibers 110. In order to avoid such risk, after the end surface of the plurality of fibers 110 reaches a position near the end surface 203 of the platform 202 in the ferrule 200, the cable holder 10 is moved upward by a predetermined distance in the third direction Z by the moving mechanism 1, so as to prevent the lower edge of the end surface profile of the plurality of fibers 110 from contacting and colliding with the upper edge of the end surface 203 of the platform 202.

The predetermined distance may be determined based on a maximum allowable tolerance of the diameter of the fiber 110, for example, the predetermined distance may be larger than half of the maximum allowable tolerance of the diameter of the fiber 110. In addition, the predetermined distance is not too large, so as to prevent an upper edge of the end surface profile of the plurality of fibers 110 from contacting and colliding with the upper edge of the plurality of bores 210. In an embodiment, the predetermined distance is less than half of a difference between a minimum diameter and a maximum diameter of the fiber 110 in the allowable manufacturing error range, and is less than the maximum allowable tolerance of the diameter of the fiber 110.

A first speed of the moving mechanism 1 inserting the plurality of fibers 110 into the ferrule 200 is larger than a second speed of the moving mechanism 1 moving an end surface of the outer protection layer 120 to the end surface 203 of the platform 202. When the fibers 110 just enter into the cable receiving chamber 201 of the ferrule 200, the fibers 110 are not subjected to any resistance, and may be moved at a higher speed in the cable receiving chamber 201 to increase the fiber insertion efficiency. When the fibers 110 have entered into the bores 210, they are subjected to relatively higher resistance, and are moved at a lower speed to prevent the fibers 110 from being broken.

A method of inserting the plurality of fibers 110 of the cable 100 into the plurality of bores 210 of the ferrule 200 by using the above system will now be described with reference to FIGS. 3-5. The method comprises the steps of:

Step 1, providing the system as stated in the above embodiments.

Step 2, holding the cable 100 and the ferrule 200 on the cable holder 10 and the ferrule holder 20, respectively.

Step 3, identifying the center of the end surface profile of the plurality of fibers 110 and a center of an end surface profile of the ferrule 200 using the vision device 30, 40. The third step may include the steps of capturing a first image of the plurality of fibers 110 and the ferrule 200 in the third direction Z by using the first imaging apparatus 30, capturing a second image of the plurality of fibers 110 and the ferrule 200 in the first direction X by using the second imaging apparatus 40, identifying a center line L101 of the plurality of fibers 110 and a center line L201 of the ferrule 200 in the first image, and identifying a center line L102 of the plurality of fibers 110 and a center line L202 of the ferrule 200 in the second image using the image recognition apparatus.

Step 4, moving the cable holder 10 under the guidance of the vision device 30, 40 by moving the moving mechanism 1, so that the center of the end surface profile of the plurality of fibers 110 is aligned with the center of the end surface profile of the ferrule 200. The fourth step may include the steps of moving the cable holder 10 in the first direction X by using the moving mechanism 1 under the guidance of the vision device 30, 40, so that the center line L101 of the plurality of fibers 110 and the center line L201 of the ferrule 200 in the first image are aligned with each other, and moving the cable holder 10 in the third direction Z by using the moving mechanism 1 under the guidance of the vision device 30, 40, so that the center line L102 of the plurality of fibers 110 and the center line L202 of the ferrule 200 in the second image are aligned with each other.

Step 5, moving the cable holder 10 using the moving mechanism 1 so that the plurality of fibers 110 are inserted into the plurality of bores 210 of the ferrule 200. The fifth step may include the steps of moving the cable holder 10 in the second direction Y at a first speed using the moving mechanism 1 under the guidance of the vision device 30, 40, until an end surface of the at least one plurality of fibers 110 is near an end surface 203 of a platform 202 in the ferrule 200, vertically moving the cable holder 10 upward by a predetermined distance in the third direction Z using the moving mechanism 1 under the guidance of the vision device 30, 40, so that a lower edge of the end surface profile of the plurality of fibers 110 is higher than an upper edge of the end surface 203 of the platform 202, and moving the cable holder 10 in the second direction Y at a second speed using the moving mechanism 1 under the guidance of the vision device 30, 40, until an end surface of an outer protection layer 120 of the cable 100 reaches the end surface 203 of the platform 202.

Advantageously, in the system for automatically inserting fibers according to the present invention, the moving mechanism 1 automatically aligns the plurality of fibers 110 with the ferrule 200 and automatically inserts the plurality of fibers 110 into the plurality of bores 210, improving the fiber insertion efficiency and quality.

What is claimed is:

1. A system for automatically inserting fibers, comprising:
   a cable having a plurality of fibers;
   a ferrule having a plurality of bores;
   a moving mechanism movable in a first direction, a second direction, and a third direction that are perpendicular to each other;
   a cable holder mounted on the moving mechanism and holding the cable; and
   a vision device, the moving mechanism moving the cable holder under the guidance of the vision device to align the plurality of fibers with the ferrule and insert the plurality of fibers into the plurality of bores, the vision device identifying a center of an end surface profile of the plurality of fibers and a center of an end surface profile of the ferrule.

2. The system of claim 1, wherein the moving mechanism moves the cable holder under the guidance of the vision device to align the center of the end surface profile of the plurality of fibers with the center of the end surface profile of the ferrule.

3. The system of claim 1, wherein the third direction is a vertical direction, and the first direction and the second direction define a horizontal plane perpendicular to the third direction.

4. The system of claim 1, further comprising a ferrule holder holding the ferrule.

5. The system of claim 4, wherein the cable is positioned in the cable holder so that a top surface and a bottom surface of the cable are parallel to a plane defined by the first direction and the second direction, and the ferrule is positioned in the ferrule holder so that a top surface and a bottom surface of the ferrule are parallel to the plane defined by the first direction and the second direction.

6. The system of claim 4, wherein the ferrule holder and the vision device are stationary.

7. The system of claim 4, wherein the ferrule holder has a stationary block mounted on a working table, and the ferrule is positioned in a ferrule positioning slot formed in the stationary block.

8. The system of claim 1, wherein the cable holder has a stationary seat and a movable pressing plate, the cable is positioned in a cable positioning slot formed in the stationary seat, and the movable pressing plate presses the cable.

9. The system of claim 1, wherein the vision device has a first imaging apparatus positioned so that an optical axis thereof is parallel to the third direction, the first imaging apparatus capturing a first image of the plurality of fibers and the ferrule in the third direction, and a second imaging apparatus positioned so that an optical axis thereof is parallel to the first direction, the second imaging apparatus capturing a second image of the plurality of fibers and the ferrule in the first direction.

10. The system of claim 9, wherein the vision device has an image recognition apparatus identifying a first center line of the plurality of fibers and a first center line of the ferrule in the first image, and identifying a second center line of the plurality of fibers and a second center line of the ferrule in the second image.

11. The system of claim 10, wherein the moving mechanism moves the cable holder under the guidance of the vision device in the first direction to align the first center line of the plurality of fibers with the first center line of the ferrule, in the third direction to align the second center line of the plurality of fibers with the second center line of the ferrule, and in the second direction to insert the plurality of fibers into the plurality of bores.

12. The system of claim 11, wherein the ferrule has a cable receiving chamber, a platform formed on and protruding from a bottom surface of the cable receiving chamber, a plurality of guiding recesses formed in a top surface of the platform, and an opening formed in a top wall of the cable receiving chamber through which the platform is exposed to the outside.

13. The system of claim 12, wherein the first imaging apparatus is positioned above the cable holder and the ferrule holder and captures a third image of an end surface of the plurality of fibers relative to an end surface of the platform, the image recognition apparatus determining a position of the end surface of the plurality of fibers relative to the end surface of the platform based on the third image.

14. A method of automatically inserting fibers, comprising:

providing a system including a cable having a plurality of fibers, a ferrule having a plurality of bores, a moving mechanism movable in a first direction, a second direction, and a third direction that are perpendicular to each other, a cable holder mounted on the moving mechanism, a ferrule holder, and a vision device;

holding the cable on the cable holder and holding the ferrule on the ferrule holder;

identifying a center of an end surface profile of the plurality of fibers and a center of an end surface profile of the ferrule using the vision device;

moving the cable holder using the moving mechanism under the guidance of the vision device to align the center of the end surface profile of the plurality of fibers with the center of the end surface profile of the ferrule; and inserting the plurality of fibers into the plurality of bores using the moving mechanism to move the cable holder under the guidance of the vision device.

15. The method of claim 14, wherein the identifying step comprises capturing a first image of the plurality of fibers and the ferrule in the third direction using a first imaging apparatus, capturing a second image of the plurality of fibers and the ferrule in the first direction using a second imaging apparatus, and identifying a first center line of the plurality of fibers and a first center line of the ferrule in the first image, and a second center line of the plurality of fibers and a second center line of the ferrule in the second image, using an image recognition apparatus.

16. The method of claim 15, wherein the moving step comprises moving the cable holder in the first direction using the moving mechanism under the guidance of the vision device to align the first center line of the plurality of fibers and the first center line of the ferrule, and moving the cable holder in the third direction using the moving mechanism under the guidance of the vision device to align the second center line of the plurality of fibers and the second center line of the ferrule.

17. The method of claim 16, wherein the inserting step comprises moving the cable holder in the second direction at a first speed using the moving mechanism under the guidance of the vision device until an end surface of the plurality of fibers is adjacent an end surface of a platform in the ferrule, moving the cable holder by a predetermined distance in the third direction using the moving mechanism under the guidance of the vision device such that a lower edge of the end surface profile of the plurality of fibers is higher than an upper edge of the end surface of the platform, and moving the cable holder in the second direction at a second speed using the moving mechanism under the guidance of the vision device until an end surface of an outer protection layer of the cable reaches the end surface of the platform.

18. The method of claim 17, wherein the first speed is larger than the second speed.

19. The method of claim 17, wherein the predetermined distance is larger than half of a maximum allowable tolerance of a diameter of one of the plurality of fibers.

20. A system for automatically inserting fibers, comprising:

a cable having a plurality of fibers;

a ferrule having a plurality of bores;

a moving mechanism movable in a first direction, a second direction, and a third direction that are perpendicular to each other;

a cable holder mounted on the moving mechanism and holding the cable; and a vision device, the moving mechanism moving the cable holder under the guidance of the vision device to align the plurality of fibers with the ferrule and insert the plurality of fibers into the plurality of bores, the vision device having a first imaging apparatus positioned so that an optical axis thereof is parallel to the third direction, the first imaging apparatus capturing a first image of the plurality of fibers and the ferrule in the third direction, a second imaging apparatus positioned so that an optical axis thereof is parallel to the first direction, the second imaging apparatus capturing a second image of the plurality of fibers and the ferrule in the first direction, and an image recognition apparatus identifying a first center line of the plurality of fibers and a first center line of the ferrule in the first image, and identifying a second center line of the plurality of fibers and a second center line of the ferrule in the second image.

21. The system of claim 20, wherein the moving mechanism moves the cable holder under the guidance of the vision device in the first direction to align the first center line of the plurality of fibers with the first center line of the ferrule, in the third direction to align the second center line of the plurality of fibers with the second center line of the ferrule, and in the second direction to insert the plurality of fibers into the plurality of bores.

22. The system of claim 21, wherein the ferrule has a cable receiving chamber, a platform formed on and protruding from a bottom surface of the cable receiving chamber, a plurality of guiding recesses formed in a top surface of the platform, and an opening formed in a top wall of the cable receiving chamber through which the platform is exposed to the outside.

23. The system of claim 22, wherein the first imaging apparatus is positioned above the cable holder and the ferrule holder and captures a third image of an end surface of the plurality of fibers relative to an end surface of the platform, the image recognition apparatus determining a position of the end surface of the plurality of fibers relative to the end surface of the platform based on the third image.

\* \* \* \* \*